US010988492B2

(12) United States Patent
Stache et al.

(10) Patent No.: US 10,988,492 B2
(45) Date of Patent: Apr. 27, 2021

(54) LOW-VISCOSITY CROSSLINKERS CONTAINING ALKOXYSILANE GROUPS

(71) Applicant: Evonik Operations GmbH, Essen (DE)

(72) Inventors: Wiebke Stache, Herten (DE); Emmanouil Spyrou, Schermbeck (DE); Iris Brückner, Dorsten (DE); Ralf Klawikowski, Recklinghausen (DE); Jan Pfingsten, Castrop-Rauxel (DE); Judith Schoder, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 133 days.

(21) Appl. No.: 16/381,560

(22) Filed: Apr. 11, 2019

(65) Prior Publication Data
US 2019/0315778 A1  Oct. 17, 2019

(30) Foreign Application Priority Data

Apr. 16, 2018 (EP) .................... 18167525

(51) Int. Cl.
*C07F 7/18* (2006.01)
*C09D 7/63* (2018.01)
*C08K 5/10* (2006.01)
*C08K 5/20* (2006.01)
*C08K 5/5465* (2006.01)
*C08L 75/04* (2006.01)

(52) U.S. Cl.
CPC .............. *C07F 7/1804* (2013.01); *C08K 5/10* (2013.01); *C08K 5/20* (2013.01); *C08K 5/5465* (2013.01); *C08L 75/04* (2013.01); *C09D 7/63* (2018.01); *C08K 2201/014* (2013.01)

(58) Field of Classification Search
CPC .................................................. C07F 7/1804
See application file for complete search history.

(56) References Cited

U.S. PATENT DOCUMENTS

| | | |
|---|---|---|
| 6,426,414 B1 | 7/2002 | Laas et al. |
| 2007/0123644 A1 | 5/2007 | Pfeiffer et al. |
| 2009/0011256 A1 | 1/2009 | Ito et al. |
| 2015/0266992 A1 | 9/2015 | Spyrou et al. |
| 2015/0329751 A1 | 11/2015 | Stache et al. |

FOREIGN PATENT DOCUMENTS

| | | |
|---|---|---|
| DE | 10 2012 217 549 | 3/2014 |
| EP | 0 959 087 | 11/1999 |

OTHER PUBLICATIONS

Sheng, et al. ("Coordination bonding assembly and photophysical properties of Europium organic/inorganic/polymeric hybrid materials", Journal of Photochemistry and Photobiology, Chemistry (2009), 206(2-3), 140-147, Department of Chemistry, Tongji University, Shanghai).*

Qiao, et al. ("Covalently Bonded Assembly of Lanthanide/Silicon-Oxygen Network/Polyethylene Glycol Hybrid Materials through Functionalized 2-Thenoyltrifluoroacetone Linkage", J. Phys. Chem. B (2009), 113, 11865-11875, Department of Chemistry, Tongji University, Siping Road 1239, Shanghai 200092, China).*

Yan et al. ("A luminescent covalently bonded rare earth hybrid material by functionalized trifluoroacetylacetone linkage", Journal of Non-Crystalline Solids, vol. 355, Issues 22-23, Jul. 15, 2009, pp. 1281-1284).*

U.S. Appl. No. 14/711,370, filed May 13, 2015, U.S. Pat. No. 2015/0329751, Stache et al.

* cited by examiner

*Primary Examiner* — Arrie L Reuther
(74) *Attorney, Agent, or Firm* — Grüneberg and Myers PLLC

(57) ABSTRACT

Crosslinkers based on alkoxysilanes and alkoxysilane mixtures containing an isocyanate group can be used as a starting component in the production of coating compositions or as paint binder component, or can be used with adhesive o sealant binders o binder components having g ups reactive toward alkoxysilane groups.

13 Claims, No Drawings

LOW-VISCOSITY CROSSLINKERS CONTAINING ALKOXYSILANE GROUPS

CROSS-REFERENCE TO RELATED APPLICATIONS

The present application claims priority to European patent application EP 18167525.7 filed Apr. 16, 2018, the content of which is incorporated by reference in its entirety.

BACKGROUND OF THE INVENTION

Field of the Invention

The present invention relates to crosslinkers based on alkoxysilanes and alkoxysilane mixtures containing an isocyanate group, to a process for preparation thereof, to compositions comprising these crosslinkers and to the use thereof as starting component in the production of coating compositions or as paint binder component, to adhesive or sealant binders or binder components having groups reactive toward alkoxysilane groups.

Discussion of the Background

Polyisocyanates are used preferentially in coatings, adhesives and sealants technology owing to their high reactivity and versatile usability. There is widespread use of polyisocyanates as crosslinker of acrylate resins produced by the process of solution polymerization. The crosslinking reaction is based here on the reaction between the OH groups present in the acrylate resins with the NCO function of the polyisocyanates.

Free monomeric diisocyanates are undesirable here for reasons of toxicology and occupational hygiene. An aim is therefore to use polyisocyanates rather than diisocyanates, since polyisocyanates can be classified as less hazardous owing to their lower vapour pressure. The standard polyisocyanates are based either on an isocyanurate structure or a biuret structure. A disadvantage is that the polyisocyanates have a higher viscosity than the monomeric diisocyanates.

Alternatively, the monomeric diisocyanates can be converted to a prepolymer by a reaction with alcohol-containing components. This is accomplished, for example, by reaction with polyester alcohols or polyether alcohols and subsequent distillative removal of the excess monomeric diisocyanate. However, the resultant low-monomer NCO-containing prepolymer generally has significantly elevated viscosity and a distinctly lower NCO content, which leads to a lower crosslinking density. Both properties are undesirable. Against the background of increasingly stricter environmental legislation, there is now a search for NCO-free crosslinkers that are of no toxicological concern and simultaneously also have low viscosity, such that they can be used in paints with reduced solvent content.

DE10 2012 217 549 describes low-viscosity low-monomer NCO prepolymers that form from the reaction of an excess of diisocyanates with a CH-acidic compound. Removal of the excess monomeric diisocyanate results in low-monomer NCO-containing prepolymers having a high NCO content and low viscosity. However, a disadvantage is that the products are NCO-containing products, which should be avoided from a toxicological point of view.

Water-dispersible polyisocyanates constitute a class of hydrophilic crosslinkers which have gained in importance in recent years for various fields of application. They are nowadays used in particular as crosslinker components for acrylate-based coating materials, high-quality water-thinnable two-component polyurethane coating materials (two-component PU coating materials), or as admixtures for aqueous dispersion-based adhesives. They serve for crosslinking of aqueous dispersions in the finishing of textiles or leather, or for crosslinking formaldehyde-free textile printing inks, and are also suitable, furthermore, for example as auxiliaries for the wet-strengthening of paper, as disclosed in EP 0 959 087 A1, for example.

SUMMARY OF THE INVENTION

The problem addressed by the present invention is thus that of avoiding the disadvantages of the known related art. More particularly, the problem addressed by the present invention is that of providing crosslinkers, preferably low-viscosity crosslinkers, which, as addition in coating compositions, lead to hard and/or chemical-resistant coatings.

The present problem is surprisingly solved by the crosslinkers according to the invention, which are especially reaction products of isocyanatoalkylalkoxysilanes and CH-acidic compounds, especially to form NCO-free crosslinkers and preferably crosslinkers having low viscosity and good compatibility with solvent-containing paint binders. The low-viscosity crosslinkers according to the invention are suitable for use in paint formulations and lead to hard, chemical-resistant coatings.

The present invention relates to various embodiments, including, but not limited to, the following embodiments:

1. Crosslinker of the formula I or a mixture of at least two crosslinkers of the formula (I)

(I)

where $R^1$ and $R^2$ are each independently selected from H, —$(CH_2)_rR^4$, with r=0 to 12, especially r=1 to 8, —$OR^5$, —$NHR^5$, where $R^4$ and $R^5$ are each independently selected from the group consisting of H, an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group optionally containing a heteroatom, especially —O— and/or —N—, and having 6 to 18 carbon atoms, a bivalent alkylene group having 1 to 10 carbon atoms, an alkylene oxide group having at least 4 carbon atoms, especially having 4 to 16 carbon atoms, for example an epoxybutyl, epoxypentyl, epoxyhexyl, epoxyheptyl, epoxyoctyl, epoxynonyl or epoxydecyl group, a polyether group, such as polyalkylene oxide polyether, a polyhydroxyfunctional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, of which preferably at least one is arranged in a terminal position, where p is 4 to 20 and R'' is an alkyl radical having 1 to 18 carbon atoms or H, and where each $G^1$ is independently selected from the group consisting of H and a group of the formula IIa with the proviso that at least one $G^1$ corresponds to a group of the formula IIa $$—(C=O)—NH—R—Si(OR')_3 \quad (IIa)$$

where R in the formula IIa is independently an aliphatic (cyclo)alkylene radical having 1 to 10 carbon atoms, and R' in formula IIa in each case independently represents a linear, branched or cyclic alkyl radical having 1 to 10 carbon atoms.

2. Crosslinker according to embodiment 1, characterized in that a) in the crosslinker of the formula (I) at least one of $R^1$ and $R^2$ is selected from —$OR^5$ where $R^5$ is as defined above, or b) in the crosslinker of the formula (I) $R^1$ and $R_2$ are selected from —$OR_5$ where $R^5$ is as defined above.

3. Composition comprising at least one crosslinker of the general formula I or a mixture comprising at least two of the crosslinkers of the general formula I

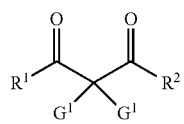

(I)

where $R^1$ and $R^2$ are each independently selected from H, —$(CH_2)_rR^4$, with r=0 to 12, especially r=1 to 8, —$OR^5$, —$NHR^5$, where $R^4$ and $R^5$ are each independently selected from the group consisting of H, an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group optionally containing a heteroatom, especially —O— and/or —N—, and having 6 to 18 carbon atoms, a bivalent alkylene group having 1 to 10 carbon atoms, an alkylene oxide group having at least 4 carbon atoms, especially having 4 to 16 carbon atoms, for example an epoxybutyl, epoxypentyl, epoxyhexyl, epoxyheptyl, epoxyoctyl, epoxynonyl or epoxydecyl group, a polyether group, such as polyalkylene oxide polyether, a polyhydroxyfunctional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, of which preferably at least one is arranged in a terminal position, where p is 4 to 20 and R'' is an alkyl radical having 1 to 18 carbon atoms or H, and where each $G^1$ is independently selected from the group consisting of H and a group of the formula IIa with the proviso that at least one $G^1$ corresponds to a group of the formula IIa $$—(C=O)—NH—R—Si(OR')_3 \quad (IIa)$$

where R in the formula IIa is independently an aliphatic (cyclo)alkylene radical having 1 to 10 carbon atoms, and R' in formula IIa in each case independently represents a linear, branched or cyclic alkyl radical having 1 to 10 carbon atoms.

4. Composition according to embodiment 3, characterized in that
a) $R^1$ and $R^2$ in formula (I) are selected from —$OR^5$ where $R^5$ is as defined above, or b) $R^1$ in formula (I) is selected from —$(CH_2)_rR^4$, with (i) r=0 or (ii) r=1 to 12, especially r=1 to 8, where $R^4$ is in each case independently selected from the group consisting of an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group containing a heteroatom, especially —O— and/or —N—, and having 6 to 18 carbon atoms, an alkylene oxide group having at least 4 carbon atoms, especially having 4 to 16 carbon atoms, and a heteroaromatic group containing an —O— and/or —N— and having 5 to 18 carbon atoms, and $R^2$ is selected from —$OR^5$ where $R^5$ is as defined above.

5. Composition according to embodiment 3 or 4, characterized in that the crosslinker of the formula (I) is a β-diester, for example a malonic ester, a cyclic β-diketone, a β-keto ester and/or a β-amide ester.

6. Composition according to any of embodiments 3 to 5, characterized in that R in the formula (IIa) is in each case independently an aliphatic alkylene radical having 1 to 10 carbon atoms, and R' in each case independently represents a linear, branched or cyclic alkyl radical having 1 to 4 carbon atoms or H.

7. Composition according to any of embodiments 3 to 6, characterized in that R in formula (IIa) is in each case independently an aliphatic alkylene radical having 1 to 10 carbon atoms, R' in formula (IIa) in each case independently represents a linear, branched or cyclic alkyl radical having 1 to 4 carbon atoms or H, and $R^1$ and $R^2$ in formula (I) are each independently selected from —$OR^5$ where $R^5$ is selected from an alkyl group having 1 to 18 carbon atoms, a cycloalkyl group having 3 to 18 carbon atoms, an alkylaryl group having 6 to 18 carbon atoms and an alkylene oxide group having at least 4 carbon atoms.

8. Process for preparing a composition comprising a crosslinker of the general formula (I) or a mixture comprising at least two of the crosslinkers of the general formula (I) by reacting, in a step (i):
at least one isocyanatoalkylalkoxysilane of the formula (II) or a mixture of at least two of the isocyanatoalkylalkoxysilanes of the formula (II)

$$(R'O)_3Si—R—N=C=O \quad (II)$$

where R is in each case independently an aliphatic (cyclo)alkylene radical having 1 to 10 carbon atoms, and R' in each case independently represents a linear, branched or cyclic alkyl radical having 1 to 10 carbon atoms,
with an organofunctional C—H-acidic compound of the formula (III) having at least two acidic hydrogen atoms,

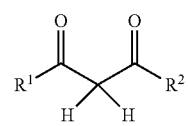

(III)

where $R^1$ and $R^2$ are each independently selected from H, —$(CH_2)_rR^4$, with r=0 to 12, especially r=1 to 8, —$OR^5$ and —$NHR^5$, where $R^4$ and $R^5$ are each independently selected from the group consisting of H, an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group optionally containing a heteroatom, especially —O— and/or —N—, and having 6 to 18 carbon atoms, a bivalent alkylene group having 1 to 10 carbon atoms, an alkylene oxide group having at least 4 carbon atoms, especially having 4 to 16 carbon atoms, for example an epoxybutyl, epoxypentyl, epoxyhexyl, epoxyheptyl, epoxyoctyl, epoxynonyl or epoxydecyl group, a polyether group, such as polyalkylene oxide polyether, a polyhydroxy-functional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, of which preferably at least one is arranged in a terminal position, where p is 4 to 20 and R" is an alkyl radical having 1 to 18 carbon atoms or H.

9. Process according to embodiment 8, characterized in that the reaction is effected in the presence of a catalyst.

10. Process according to embodiment 8 or 9, characterized in that the process comprises the following steps:
  (ii) removing excess isocyanatoalkylalkoxysilane of the formula (II), or reacting excess isocyanatoalkylalkoxysilane of the formula (II) with a hydroxy-functional hydrocarbon compound, and
  (iii) obtaining a composition comprising at least one crosslinker of the general formula (I) or a mixture of at least two of the crosslinkers of the formula (I).

11. Process according to any of embodiment 8 to 10, characterized in that the isocyanatoalkylalkoxysilane of the formula (II) is selected from isocyanatopropyltriethoxysilane and isocyanatopropyltrimethoxysilane.

12. Process according to any of embodiment 8 to 11, characterized in that the reaction of isocyanatoalkylalkoxysilane of the formula (II) with the organofunctional C—H-acidic compound of the formula (III) is effected in a molar ratio of 1.1:1 to 100:1.

13. Composition comprising
  (i) at least one crosslinker or a mixture of crosslinkers according to embodiment 1 or 2 or a composition according to any of embodiments 3 to 7 or a composition obtainable by a process according to any of embodiments 8 to 12,
  (ii) optionally organic solvents,
  (iii) one or more binders,
  (iv) optionally up to 4% by weight of at least one catalyst,
  (v) optionally auxiliaries and/or additives,
  (vi) optionally water.

14. Use of a composition according to any of embodiment 1 to 7 or obtained according to any of embodiments 8 to 12 for treatment of substrates based on metals, alloys, wood, glass, stone, ceramic materials, hybrid materials, concrete, rigid plastics, flexible plastics, textiles, leather and/or paper.

DETAILED DESCRIPTION OF THE INVENTION

The present invention relates to a crosslinker of the formula I or to a mixture of at least two crosslinkers of the formula (I)

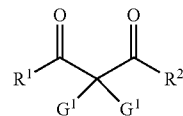
(I)

where $R^1$ and $R^2$ are each independently selected from H, $-(CH_2)_rR^4$, with r=0 to 12, especially r=1 to 8, $-OR^5$, $-NHR^5$, where $R^4$ and $R^5$ are each independently selected from the group consisting of H, an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group optionally containing a heteroatom, especially —O— and/or —N—, and having 6 to 18 carbon atoms, a bivalent alkylene group having 1 to 10 carbon atoms, an alkylene oxide group having at least 4 carbon atoms, especially having 4 to 16 carbon atoms, for example an epoxybutyl, epoxypentyl, epoxyhexyl, epoxyheptyl, epoxyoctyl, epoxynonyl or epoxydecyl group, a polyether group, such as polyalkylene oxide polyether, a polyhydroxy-functional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, of which preferably at least one is arranged in a terminal position, where p is 4 to 20 and R" is an alkyl radical having 1 to 18 carbon atoms or H, and where each $G^1$ is independently selected from the group consisting of H and a group of the formula IIa, with the proviso that at least one $G^1$ corresponds to a group of the formula IIa

—(C=O)—NH—R—Si(OR')$_3$ (IIa)

where R in the formula (IIa) is independently an aliphatic (cyclo)alkylene radical having 1 to 10 carbon atoms, and R' in formula (IIa) in each case independently represents a linear, branched or cyclic alkyl radical having 1 to 10 carbon atoms.

In a preferred embodiment, a) in the crosslinker of the formula (I) at least one of $R^1$ and $R^2$ is selected from $-OR^5$ where $R^5$ is as defined above, or b) in the crosslinker of the formula (I) $R^1$ and $R_2$ are selected from $-OR_5$ where $R^5$ is as defined above.

In a preferred embodiment, both $G^1$ in the crosslinker of the formula (I) are a group of the formula (IIa). Alternatively, it may be preferable when one $G^1$ is an H and one $G^1$ is a group of the formula (IIa) in the crosslinker of the formula (I).

The compounds of the formula I may also be represented as compounds of the formula (Ia) and (Ib), where Ib shall also be understood to include the structurally isomeric compounds,

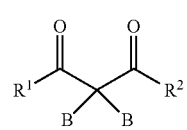
(Ia)

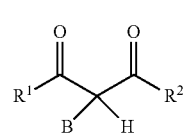
(Ib)

where B is a group of the formula (IIa) —(C═O)—NH—R—Si(OR')$_3$.

The invention also relates to a composition comprising at least one crosslinker of the general formula I or a mixture comprising at least two of the crosslinkers of the general formula I

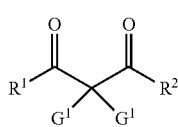

(I)

where R$^1$ and R$^2$ are each independently selected from H, —(CH$_2$)$_r$R$^4$, with r=0 to 12, especially r=1 to 8, —OR$^5$ and —NHR$^5$, where R$^4$ and R$^5$ are each independently selected from the group consisting of H, an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group optionally containing a heteroatom, especially —O— and/or —N—, and having 6 to 18 carbon atoms, a bivalent alkylene group having 1 to 10 carbon atoms, an alkylene oxide group having at least 4 carbon atoms, especially having 4 to 16 carbon atoms, for example an epoxybutyl, epoxypentyl, epoxyhexyl, epoxyheptyl, epoxyoctyl, epoxynonyl or epoxydecyl group, a polyether group, such as polyalkylene oxide polyether, a polyhydroxy-functional group having 1 to 18 carbon atoms, a heteroaromatic group containing —O— and/or —N— and having 5 to 18 carbon atoms and an —O— or —NH-polyether group containing one or more different polyglycol units (CH$_2$CH$_2$O)$_p$R", of which preferably at least one is arranged in a terminal position, where p is 4 to 20 and R" is an alkyl radical having 1 to 18 carbon atoms or H, and where each G$^1$ is independently selected from the group consisting of H and a group of the formula IIa, with the proviso that at least one G$^1$ corresponds to a group of the formula IIa

(IIa)

where R in the formula (IIa) is independently an aliphatic (cyclo)alkylene radical having 1 to 10 carbon atoms, and R' in formula (IIa) in each case independently represents a linear, branched or cyclic alkyl radical having 1 to 10 carbon atoms.

(Cyclo)alkylene radicals are understood to mean cycloalkylene radicals and alkylene radicals alike, especially cycloalkylene radicals or alkylene radicals having 1 to 10 carbon atoms. Preferably, R in the formula (IIa) is in each case independently an aliphatic (cyclo)alkylene radical, preference being given to bivalent alkyl radicals having 1 to 10 carbon atoms, particular preference to alkylene radicals selected from methylene, ethylene, propylene, butylene, heptylene and hexylene. C atom is used synonymously with carbon atom.

In alternative embodiments, the composition may be an aqueous composition, especially aqueous dispersions, preferably emulsions.

In a preferred composition, one of R$^1$ and R$^2$ or both R$^1$ and R$^2$ in the crosslinker of the formula (I) or the mixture of at least two of the crosslinkers of the formula (I) in the composition is/are selected from —OR$^5$ where R$^5$ is as defined above.

In a preferred composition, both G$^1$ in the crosslinker of the formula (I) are a group of the formula (IIa). Alternatively, it may be preferable when one G$^1$ is an H and one G$^1$ is a group of the formula (IIa) in the crosslinker of formula (I). Likewise, preferred are compositions containing a mixture comprising at least one crosslinker of the formula (Ia) or (Ib), or containing a mixture comprising at least one crosslinker each of the formula (Ia) and (Ib).

In a particularly preferred embodiment, R in the formula (IIa) is in each case independently an aliphatic alkylene radical having 1 to 10 carbon atoms, and the R' is in each case independently a linear, branched or cyclic alkyl radical having 1 to 4 carbon atoms. More preferably, R in formula (IIa) is in each case independently an aliphatic alkylene radical having 1 to 4 carbon atoms, and R' is in each case independently methyl or ethyl.

In a further-preferred embodiment, R in formula (IIa) is in each case independently an aliphatic alkylene radical having 1 to 10 carbon atoms, the R' is in each case independently a linear, branched or cyclic alkyl radical having 1 to 4 carbon atoms, and R$^1$ and R$^2$ in the formula (I) are each independently selected from —OR$^5$ where R$^5$ is selected from an alkyl group having 1 to 18 carbon atoms, a cycloalkyl group having 3 to 18 carbon atoms, an alkylaryl group having 6 to 18 carbon atoms and an alkylene oxide group having at least 4 carbon atoms.

In particularly preferred embodiments, the R$^1$ and R$^2$ radicals in the crosslinkers of the formula (I) or a mixture of at least two of the crosslinkers of the formula (I) or the composition comprising a crosslinker or mixtures thereof are defined as follows:

a) R$^1$ and R$^2$ in formula (I) are selected from —OR$^5$ where R$^5$ is as defined above, or b) R$^1$ in formula (I) is selected from —(CH$_2$)$_r$R$^4$, with (i) r=0 or (ii) r=1 to 12, especially r=1 to 8, where R$^4$ is in each case independently selected from the group consisting of an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group containing a heteroatom, especially —O— and/or —N—, and having 6 to 18 carbon atoms, an alkylene oxide group having at least 4 carbon atoms, especially having 4 to 16 carbon atoms, and a heteroaromatic group containing an —O— and/or —N— and having 5 to 18 carbon atoms, and R$^2$ is selected from —OR$^5$ where R$^5$ is as defined above.

Preferably, R$^5$ in the formula (I), in the above alternative a), is selected from the group consisting of an alkyl group having 1 to 10 carbon atoms, a cycloalkyl group having 3 to 10 carbon atoms and an alkylene oxide group having at least 4 carbon atoms, especially having 4 to 16 carbon atoms, and, in the above alternative b), is selected from the group consisting of a polyether group, such as polyalkylene oxide polyether, a polyhydroxy-functional group having 1 to 18 carbon atoms and an —O— or —NH-polyether group containing one or more different polyglycol units (CH$_2$CH$_2$O)$_p$R", of which at least one is preferably arranged in a terminal position, where p is 4 to 20 and R" is an alkyl radical having 1 to 18 carbon atoms or H.

Preferred polyethers according to R$^4$ and/or —OR$^5$ may be polyethylene glycol polyethers such as —O—(CH$_2$CH$_2$O)$_x$—R* with x=2 to 100, especially 2 to 50, or polypropylene glycol polyethers, and also O—(CH$_2$CH$_3$CH$_2$O)$_y$—R* or O—(CH$_2$CH$_2$CH$_3$O)$_y$—R* with y=2 to 100, especially 2 to 50.

In a particularly preferred embodiment of the present invention, the crosslinker of the formula (I) is a β-diester, for example a malonic ester, a cyclic β-diketone, a β-keto ester and/or a β-amide ester. The crosslinker of the formula (I) is especially a malonic ester or a β-keto ester.

As well as the two carbonyl groups, the compound of the formula (I) may additionally have at least one electron-withdrawing group or at least one electron-withdrawing substituent; the electron-withdrawing group or the substituent especially comprises at least one atom more electronegative than carbon. The electron-withdrawing group may comprise groups of any atoms that lead to CH acidity of the hydrogen in the alpha position via inductive (e.g. —I effect) and/or mesomeric effects (e.g. -M effect).

The electron-withdrawing substituents or the electron-withdrawing groups preferably each have at least one more electronegative atom than a carbon atom and may be defined as follows:

The electron-withdrawing substituents are preferably selected from the group consisting of halogen, preferably Cl, Br, F, oxygen and/or nitrogen.

The electron-withdrawing groups are preferably selected from the group consisting of groups comprising one or more of the aforementioned electron-withdrawing substituents, ester groups, sulfoxide groups, sulfone groups, nitro groups, phosphonate groups, nitrile groups, isonitrile groups, amide groups and carbonyl groups.

In a particularly preferred embodiment, the crosslinker of the formula (I) or the composition comprising the crosslinker of the general formula (I) or the mixture comprising at least two of the crosslinkers of the general formula (I) may be obtained as defined above or is obtainable by reacting, in a step (i):

at lea one isocyanatoalkylalkoxysilane of the formula (II) or a mixtu e of at lea wo of the isocyanatoalkylalkoxysilanes of the formula (II)

(R'O)₃Si—R—N=C=O    (II)

where R is in each case independently an aliphatic (cyclo) alkylene radical having 1 to 10 carbon atoms, and R' in each case independently represents a linear, branched or cyclic alkyl radical having 1 to 10 carbon atoms, with an organofunctional C—H-acidic compound of the formula (III) having at least two acidic hydrogen atoms,

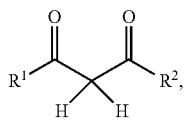

(III)

where $R^1$ and $R^2$ are each independently selected from H, —$(CH_2)_rR^4$, with r=0 to 12, especially r=1 to 8, —$OR^5$ and —$NHR^5$, where $R^4$ and $R^5$ are each independently selected from the group consisting of H, an alkyl group optionally containing a heteroatom, especially —O— and/or —N—, and having 1 to 18 carbon atoms, a cycloalkyl group optionally containing a heteroatom, especially —O— and/or —N—, and having 3 to 18 carbon atoms, an alkylaryl group optionally containing a heteroatom, especially —O— and/or —N—, and having 6 to 18 carbon atoms, a bivalent alkylene group having 1 to 10 carbon atoms, an alkylene oxide group having at least 4 carbon atoms, especially having 4 to 16 carbon atoms, for example an epoxybutyl, epoxypentyl, epoxyhexyl, epoxyheptyl, epoxyoctyl, epoxynonyl or epoxydecyl group, a polyether group, such as polyalkylene oxide polyether, a polyhydroxy-functional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, of which preferably at least one is arranged in a terminal position, where p is 4 to 20 and R'' is an alkyl radical having 1 to 18 carbon atoms or H.

Preferably, at least one of $R^1$ and $R^2$ is selected from —$OR^5$ and —$NHR^5$; more preferably, at least one of $R^1$ and $R^2$ is selected from —$OR^5$. Further preferably, both $R^1$ and $R^2$ are selected from —$OR^5$. In a particularly preferred alternative, in formula (III), $R^1$ and $R^2$ may be selected from —$(CH_2)_rR^4$ with r=2 to 12 and —$OR^5$, where $R^4$ is selected from H, an alkyl group having 1 to 18 carbon atoms, a cycloalkyl group having 3 to 18 carbon atoms and an alkylaryl having 6 to 18 carbon atoms, and where $R^5$ is selected from an alkyl group having 1 to 18 carbon atoms, an alkylaryl group having 6 to 18 carbon atoms, a polyether group, such as polyalkylene oxide polyether, where this compound of the formula (III) in particular is reacted in combination with at least one isocyanatotrimethoxysilane of the formula (II) or a mixture of an isocyanatoalkylalkoxysilane of the formula (II).

Preferably, all alkyl radicals R' in the formulae (I), (IIa) and (II) may be the same. Preferably, each R' radical may independently be selected from the group consisting of methyl, ethyl and isopropyl. Preference is given to ethyl and methyl. More preferably, each R' is a methyl radical, since in that case the resulting compounds are particularly reactive.

It has been found that, surprisingly, these reaction products can have a very low viscosity. The reaction products may also be hydrophilic and have good dispersibility in aqueous compositions.

The process according to the invention is preferably conducted in the presence of a catalyst. In a preferred embodiment, the catalyst may be a metal carboxylate, such as dibutyltin dilaurate or zinc octoate, or else a metal-free base, for example triethylamine or diazabicyclooctane. The catalyst may be added in amounts of 1% to 0.0001% by weight.

The C—H-acidic compound of the formula (III) is especially a compound having an ester function —$COOR^5$, particular preference being given to esters with $R^5$=alkyl, aryl and particular preference to esters with $R^5$=—$CH_3$, —$C_2H_5$, —$C_3H_7$. Preference is also given to C—H-acidic compounds with an ester function $COOR^5$ in which the $OR^5$ unit comes from alcohols HORS and preferably $R^5$=E, where the corresponding alcohol E-OH is a hydrophilizing agent E with an OH function. It is further preferable when, for preparation of aqueous compositions, $R^5$ is methyl and R' is methyl or ethyl or $R^5$ is methyl or ethyl and R' is methyl. For preparation of aqueous systems, it may in some cases not be appropriate to select $R^5$ from alkyl having 2 to 10 carbon atoms, such as ethyl, in combination with R' from alkyl having 2 to 10 carbon atoms, such as ethyl, especially when further external emulsifiers are not optionally present.

Examples of suitable nonionic hydrophilizing agents E with an OH function are polyalkylene oxide polyether alcohols, of the kind obtainable conventionally by alkoxylation of suitable starter molecules. Starter molecules used for polyalkylene oxide polyether alcohols may be any monohydric alcohols having a molecular weight in the range from 32 to 150. A particularly preferred starter molecule used is methanol. Alkylene oxides suitable for the alkoxylation reaction are, in particular, ethylene oxide and propylene oxide, which may be used in any order or else in a mixture in the alkoxylation reaction. The polyalkylene oxide polyether alcohols are either pure polyethylene oxide polyethers or mixed polyalkylene oxide polyethers, the alkylene oxide units of which consist to an extent of at least 70 mol %, preferably to an extent of at least 80 mol %, of ethylene oxide units.

Examples of the hydrophilizing agents E with an OH function and comprising polyalkylene oxide polyether alcohols that are used in the process according to the invention are Polyglykol M350, M350 PU (lower water content than M350), M500, M500 PU, M750, M1000 from Clariant (each linear, monohydroxy-functional polyethylene glycol monomethyl ethers having a molar mass of 350 g/mol, 500 g/mol, 750 g/mol and 1000 g/mol respectively). Preference is given to using linear, monohydroxy-functional polyethylene glycol monomethyl ethers having a molar mass of 350 g/mol and 500 g/mol.

In a particularly preferred embodiment of the present invention, the organofunctional C—H-acidic compound of the formula (III) is a β-diester, for example a malonic ester, a cyclic β-diketone, a β-keto ester and/or a β-amide ester. The organofunctional C—H-acidic compound of the formula (III) is especially a malonic ester or a β-keto ester. Particularly preferred organofunctional C—H-acidic compounds of the formula (III) are selected from cyclohexane-1,3-dione, dimedone, malonic esters, ethyl acetoacetate and derivatives thereof with polyethers.

Preferably, the at least one isocyanatoalkylalkoxysilane of the formula (II) used is a compound in which R is in each case independently a linear alkyl radical having 1 to 4 carbon atoms, and R' is in each case independently methyl or ethyl, preferably methyl. Preferred isocyanatoalkyltrialkoxysilanes of the formula (II) are isocyanatomethyltrimethoxysilane, isocyanatomethyltriethoxysilane, isocyanatomethyltriisopropoxysilane, 2-isocyanatoethyltrimethoxysilane, 2-isocyanatoethyltriethoxysilane, 2-isocyanatoethyltriisopropoxysilane, 3-isocyanato-n-propyltrimethoxysilane, 3-isocyanato-n-propyltriethoxysilane, 3-isocyanato-n-propyltriisopropoxysilane, 4-isocyanato-n-butyltrimethoxysilane, 4-isocyanato-n-butyltriethoxysilane and 4-isocyanato-n-butyltriisopropoxysilane. Further preferably, the isocyanatoalkylalkoxysilanes of the formula (II) are selected from isocyanatopropyltriethoxysilane and isocyanatopropyltrimethoxysilane; the isocyanatoalkylalkoxysilane of the formula (II) is more preferably isocyanatopropyltrimethoxysilane.

The reaction preferably of isocyanatoalkylalkoxysilane of the formula (II) with the organofunctional C—H-acidic compound of the formula (III) is preferably effected in a molar ratio of 1.1:1 to 100:1. Preference is given to a molar ratio of 10:1 to 1:1, more preferably of 5:1 to 1.5:1.

The reaction can be effected at 20 to 200° C., preferably 40 to 100° C. The reaction can be conducted until the theoretical NCO number corresponding to the molar reaction of two acidic hydrogen atoms in the C—H-acidic compound of the formula (III) used with the isocyanatoalkylalkoxysilane of the formula (II) used has been attained. The theoretical NCO number is found from the molar amount of isocyanatoalkylalkoxysilane of the formula (II) used, which ideally reacts in a molar ratio of 2:1 with the C—H-acidic compounds. The theoretical NCO number is based on overall composition in % by weight.

Generally, the reaction of isocyanatoalkylalkoxysilane of the formula (II) and the CH-acidic compound of the formula (III) can be effected in the presence of an inert solvent or without inert solvent. The reaction is preferably effected without addition of an inert solvent. In the process, for this purpose, the isocyanatoalkylalkoxysilane of the formula (II) and the C—H-acidic compound of the formula (III) are mixed in suitable equipment and the reaction temperature of 20 to 220° C., preferably 40 to 100° C., is maintained until the theoretical NCO number (corresponding to the complete reaction of the two acidic hydrogen atoms in the compounds of the formula (III)) is attained.

In preferred execution variants, the following steps may additionally be effected:

(ii) removing excess isocyanatoalkylalkoxysilane of the formula (II), or reacting isocyanatoalkylalkoxysilane of the formula (II) with a hydroxy-functional hydrocarbon compound, and (iii) obtaining a compound of the formula (I) or a composition comprising at least one crosslinker of the general formula (I) or a mixture of at least two of the crosslinkers of the formula (I). Optionally, the compound of the formula (I) or a mixture of the formulae I can be removed, for example by distillation.

In step (ii), it is optionally possible to use a catalyst selected from organometallic salts, especially of carboxylic acids and/or alcohols, for example metal carboxylates and/or metal alkoxides, especially zinc ethylhexanoate and/or octylglycol titanate.

The removal of excess isocyanatoalkylalkoxysilane of the formula (II) in step (ii): After a reaction in which isocyanatoalkylalkoxysilane of the formula (II) has been used in excess, the cooled composition can optionally be subjected to further treatment by removing solvent optionally present and the excess of monomeric isocyanatoalkylalkoxysilane of the formula (II), especially until there is a monomer content of less than 2.0% by weight. This is preferably accomplished by a gentle distillation, for example short-path distillation or thin-film distillation, preferably at temperatures of 100 to 220° C. and pressures of 0.001 mbar to 100 mbar, especially of 0.001 mbar to 50 mbar. Preference is given to a short-path distillation or thin-film distillation at temperatures of 100 to 180° C. and pressures of 0.001 mbar to 50 mbar, preferably at pressures of 0.01 mbar to 20 mbar. The compositions thus obtained comprising the inventive crosslinker of formula (I) have a monomer content of <2% by weight, preferably <1% by weight and more preferably <0.5% by weight.

The reaction of isocyanatoalkylalkoxysilane of the formula (II) with hydroxy-functional hydrocarbon compounds: If the isocyanatoalkylalkoxysilane of the formula (II) is reacted with the C—H-acidic compound in a molar ratio of 2:1 and the reaction is incomplete (i.e. an NCO content of 0% by weight of NCO is not achieved), it is possible to react residual amounts of NCO groups from the compound of the formula (II) with a hydroxy-functional hydrocarbon compound, especially an alcohol, in a ratio of NCO groups to the OH groups of the hydroxy-functional hydrocarbon compound, especially of the alcohol, of 0.8:1 to 1.2:1, preferably of 0.9:1 to 1.1:1, especially to give the corresponding urethane. The stoichiometric reaction, i.e. a ratio of NCO groups to the OH groups of the hydroxy-functional hydrocarbon compound of 1:1, is particularly preferred. Further preferably, the reaction of the residual amount of NCO groups from the compound of the formula (II) with an alcohol is conducted at temperatures in the range of 30-150° C., especially in the range of 50-150° C. The reaction is especially conducted with exclusion of water. Preference is given to conducting the reaction solventlessly.

Preferred hydroxy-functional hydrocarbon compounds are alcohols, especially linear or branched alcohols, wherein the hydroxyl function is bonded to a primary, secondary or tertiary carbon atom. It is also possible to use diols or polyols. Particular preference is given to methanol, ethanol, propanol, isopropanol, 1-butanol, 2-butanol, pentanol, ethyl-2-hexanol, 1-hexanol. Very particular preference is given to ethanol, propanol and 1-butanol.

Preferably, the composition according to the invention thus comprises reaction products of isocyanatoalkylalkoxysilanes of the formula (II) with a C—H-acidic compound of the formula (III) and optionally excess compounds of the formula (III). Optionally, the composition according to the invention additionally comprises reaction products of isocyanatoalkylalkoxysilanes of the formula (II) with a hydroxy-functional hydrocarbon compound, especially the corresponding urethanes.

The at least one inventive crosslinker of the general formula (I), especially of the formula (Ia) or (Ib), or a mixture of at least two of the crosslinkers of the formula (I), especially of the formula (Ia) and/or (Ib), are preferably of low viscosity and especially have a viscosity of less than 1000 mPas, preferably of 20 mPas to less than 1000 mPas, preferably less than 500 mPas, more preferably less than 100 mPas. It is likewise preferable when a mixture of the aforementioned crosslinkers has a corresponding viscosity of less than 1000 mPas, especially of 20 mPas to less than 1000 mPas. The determination of the viscosity can be conducted to DIN EN ISO 3219 of 01.10.1994 at 23° C.+/−0.2° C. using the "Anton Paar MCR 301" or "Anton Paar MCR 302" instruments.

In a preferred embodiment, the compositions according to the invention may especially additionally comprise
(iii) optionally at least one binder or a mixture of at least two binders,
(iv) optionally up to 4% by weight of at least one catalyst,
(v) optionally organic solvents, and
(vi) optionally auxiliaries and/or additives.

Corresponding compositions may overall comprise
(i) 1% to 20% by weight of at least one hydrophilic crosslinker of the formula (I) or mixtures of at least two of the aforementioned crosslinkers, and optionally reaction products of isocyanatoalkylalkoxysilanes of the formula (II) with a hydroxy-functional hydrocarbyl compound, and optionally of the formula (III),
(ii) 0.01% to 50% by weight, especially 5% to 50% by weight, of water,
(iii) 0% to 30% by weight, especially 0.5% to 30% by weight, of a binder or of a mixture of at least two binders, preferably comprising polyurethanes,
(iv) 0% to 4% by weight, especially 0.01% to 1% by weight, of at least one catalyst,
(v) 0% to 30% by weight of an organic solvent, and
(vi) 0% to 10% by weight of auxiliaries and/or additives,
where the overall composition is 100% by weight. The R' in formula I, Ia and/or Ib is preferably in each case independently a linear, branched or cyclic alkyl radical having 1 to 10 carbon atoms or an H. According to the water content, the hydrophilic crosslinker is in more or less hydrolysed form. Components (i) to (vi) always add up to 100% by weight.

The invention likewise provides a binder composition, especially a coating material, comprising
(i) a composition comprising or consisting of a crosslinker of the formula (I) or a mixture of at least two crosslinkers of the formula (I),
(ii) optionally organic solvents,
(iii) one or more binders,
(iv) optionally up to 4% by weight of at least one catalyst,
(v) optionally auxiliaries and/or additives,
(vi) optionally water.

These compositions may be used as coating materials that are preferably curable at temperatures of 80 to 180° C.

The proportion of the crosslinkers according to the invention as component (i) in the binder composition according to the invention, especially the coating material, is preferably 20% to 80% by weight based on the coating material.

In addition, the binder composition according to the invention, especially the coating material, may comprise organic (ii) solvents. Suitable organic solvents are, for example, ketones, esters or alcohols.

The (ii) solvents may preferably be present in an amount of 10% up to 50% by weight, based on the overall composition of 100% by weight, especially in the coating material according to the invention. The amount of the organic solvent or a mixture thereof is guided by the application viscosity to be established in the coating material.

In addition, the binder composition according to the invention, especially the coating material, comprises one or more binders (iii). Suitable binders in principle are all kinds of binders known to the skilled person, including, for example, binders which are thermoplastic, in other words not crosslinkable, and which typically have an average molecular weight >10 000 g/mol. However, preference is given to using binders comprising reactive functional groups having acidic hydrogen atoms. Suitable binders of the type mentioned have for example at least one, but preferably two or more, hydroxyl group(s). Further suitable functional groups of the binder are trialkoxysilane functionalities, for example.

More preferably, the hydrophilic crosslinkers of the formula (I) are used as crosslinkers for the binder that are water-dissolved or -dispersed paint binders or paint binder components having hydroxyl groups, and in the production of coatings. The crosslinker of the formula (I), optionally in emulsified form, may be combined here with the one or more binders by simple stirring prior to processing of the coating materials by any desired methods, by using mechanical aids known to the person skilled in the art or else using two-component spray guns.

In this connection, examples of binders, especially paint binders or paint binder components, include the following: Water-dissolved or -dispersed polyacrylates having hydroxyl groups, especially those having a molecular weight in the range from 1000 to 10 000, which, together with alkoxysilane-functionalized hydrophilic crosslinkers of the formula (I) as crosslinkers, are valuable two-component binders, or water-dispersed, optionally urethane-modified, polyester resins having hydroxyl groups of the type known from polyester and alkyd resin chemistry. In principle, suitable co-reactants for the hydrophilic crosslinkers of the formula (I) of the invention are all water-dissolved or -dispersed binders having OH groups.

Binders having functional groups that are used are preferably polymers containing hydroxyl groups, especially polyesters, polyethers, poly(meth)acrylates, polycarbonates and polyurethanes containing hydroxyl groups and having an OH number of 20 to 500 mg KOH/g and an average molar mass of 250 to 6000 g/mol. In the context of the present invention particular preference is given to using hydroxyl group-containing polyesters or poly(meth)acrylates having an OH number of 20 to 150 mg KOH/g and an average molecular weight of 500 to 6000 g/mol as binder components. The term poly(meth)acrylates is to be understood as meaning both polyacrylates and polymethacrylates. The hydroxyl number (OHN) is determined to DIN 53240-2 (11/2007). In this method the sample is reacted with acetic anhydride in the presence of 4-dimethylaminopyridine as catalyst to acetylate the hydroxyl groups. This forms one molecule of acetic acid per hydroxyl group while the subsequent hydrolysis of the excess acetic anhydride yields two molecules of acetic acid. The consumption of acetic acid is determined by titrimetry from the difference between the main value and a blank value, which is to be carried out in parallel. The molecular weight is determined by gel permeation chromatography (GPC). The samples were characterized in tetrahydrofuran eluent in accordance with DIN 55672-1 (08/2007).

(Meth)acryloyl copolymers containing hydroxyl groups that may be used include resins having a monomer composition as described, for example, in WO 93/15849. The acid number of the (meth)acrylic copolymer, which can be adjusted by using a proportion of (meth)acrylic acid as monomer, should be 0 to 30, preferably 3 to 15, mg KOH/g. The number-average molar weight (determined by gel permeation chromatography against a polystyrene standard) of the (meth)acrylic copolymer is preferably 2000 to 20 000 g/mol; the glass transition temperature is preferably –40° C. to +60° C. The hydroxyl content of the (meth)acryloyl copolymers to be used in accordance with the invention, which can be adjusted by using a proportion of hydroxyalkyl (meth)acrylates, is preferably 70 to 250 mg KOH/g, more preferably 90 to 190 mg KOH/g.

Polyester polyols suitable in accordance with the invention are resins having a monomer composition composed of di- and polycarboxylic acids and di- and polyols. Polyester polyols used may also be polyaddition products of caprolactone onto low molecular weight di- and triols, as available under the CAPA trade name (Perstorp) for example. The arithmetically determined number-average molar mass is preferably 500 to 5000 g/mol, more preferably 800 to 3000 g/mol; the average functionality is preferably 2.0 to 4.0, preferably 2.0 to 3.5.

Polyols containing urethane and ester groups that are to be used in accordance with the invention may be polyols containing urethane and ester groups that have been prepared using HPI, IPDI, trimethylhexamethylene diisocyanate (TMDI) or $H_{12}$-MDI. The number-average molar mass is preferably 500 to 2000 g/mol; the average functionality is especially in the range of 2.0 to 3.5.

Trialkoxysilane-functional binders too are suitable for use as binder. Resins of this kind can be obtained by copolymerization of acrylate or methacrylate monomers with acryloyl- or methacryloyl-functional alkyl trialkoxysilane derivatives. An alternative synthesis route involves the derivatization of hydroxyl-containing polyethers, polyesters, polycarbonatediols or polyacrylates with isocyanatopropyltrialkoxysilane.

It is of course also possible to use mixtures of the above-described binders. Preferred binders are hydroxyl-containing polyesters and polyacrylates, alone or in mixtures.

The proportion of binders (iii) in the binder composition according to the invention, especially the coating material, is preferably 10% to 80% by weight, especially 20% to 80% by weight, based on the overall composition.

The mass ratio of component (i) to component (iii) in the binder composition according to the invention, especially the coating material, is preferably 3:7 to 7:3.

To achieve a sufficient curing rate at curing temperatures of less than 100° C., preference is given to using catalysts (iv). Suitable catalysts are, in particular, Lewis acids, chelates, salts or particles of transition metals or other metals, based for example on titanium, aluminium, tin or zirconium complexes, sulfonic acids in free or else in neutralized form or in adduct form, phosphoric acid or phosphorous acids and their derivatives, high-boiling acids, quaternary ammonium carboxylates, or else combinations of the compounds mentioned. Preference is given to using chelates or salts of transition metals, or high-boiling acids, quaternary ammonium carboxylates, or combinations of the compounds mentioned.

The catalyst is more preferably selected from the group C1) of organic carboxylic acids having a melting point above 60° C. and/or from the group C2) of tetraalkylammonium carboxylates.

Suitable organic carboxylic acids C1) having a melting point above 60° C. (at atmospheric pressure) are compounds which are not volatile at room temperature. Examples of advantageously usable carboxylic acids include salicylic acid, benzoic acid, citric acid, isophthalic acid, phthalic acid, terephthalic acid and/or trimellitic acid. In the context of the present invention, preference is given to using salicylic acid and benzoic acid.

The group of the tetraalkylammonium carboxylates C2) that can be used as catalyst especially includes tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate. The tetraalkylammonium carboxylates mentioned may be added alone or in mixtures. Preference is given to using tetraethylammonium benzoate and/or tetrabutylammonium benzoate.

The catalyst in the binder compositions according to the invention that may be used as coating materials may consist solely of one or more compounds from the aforementioned groups C1) and C2), but it is also possible to use any mixtures of the catalysts from groups C1) and C2). Such mixtures of C1) and C2) especially have a ratio of 9:1 to 1:9 (m/m). The proportion of the catalyst is preferably up to 4% by weight, based on the coating material, preferably 0.1% to 4% by weight.

The binder composition according to the invention that can be used as coating material may additionally comprise (v) auxiliaries and/or additives that are known in coatings technology, such as stabilizers, light stabilizers, catalysts, fillers, pigments, levelling agents or rheological assistants, for example sag control agents, microgels or fumed silicon dioxide, in typical concentrations. If required, auxiliaries and/or additives incorporated may also be inorganic or organic colour pigments and/or effect pigments that are customary in paint technology.

The auxiliaries and/or additives, in the case of pigment-free compositions, especially coating materials, i.e. clearcoats, are present preferably in amounts of 0.5% up to 8% by weight, especially of 1% to 6% by weight, based on the overall composition of 100% by weight, especially based on the coating material. In the case of pigment-containing and/or filler-containing coating materials, the content of (v) auxiliaries and/or additives may be 5% to 80% by weight, especially 10% to 70% by weight, in the overall composition of 100% by weight, especially based on the coating material.

The sum total of all proportions of components (i), (ii), (iii), (iv), (v) and/or (vi) is 100% by weight. Preferably, the binder compositions according to the invention, especially the coating materials, consist of components (i) to (vi) mentioned.

The crosslinkers of the formula (I), the mixtures of crosslinkers of the formula (I) or the compositions according to the invention may preferably be used as paint binder component, in coating materials, especially in organic solvent-containing coating materials, in water-soluble or water-dispersible paint binders or as paint binder components, especially as a component of a 2-component polyurethane system, in a water-soluble or water-dispersible coating composition or a coating composition component, for production of polyurethane and/or acrylic plastics, or with blocked polyisocyanates, in aqueous one-component polyurethane baking systems (1K PUR).

The compositions may further be used for treatment of substrates based on metals, alloys, wood, glass, stone, ceramic materials, hybrid materials, concrete, rigid plastics, flexible plastics, textiles, leather and/or paper, which may optionally also be provided with customary primers prior to coating.

The crosslinkers according to the invention are advantageously used as a low-viscosity crosslinking component for hard and chemical-resistant coatings. For optimization of the paint mechanics, they are blended here with polymeric binders that may also bear crosslinkable functional groups. However, the reactivity of the crosslinkers according to the invention may be insufficient for a curing rate at ambient temperature. In order to increase the crosslinking rate, therefore, it is possible with preference to add catalysts and/or to carry out the curing at temperatures above ambient temperature.

Suitable for this purpose are chelates, salts or particles of transition metals or other metals, based for example on titanium, aluminium, tin or zirconium complexes, or sulfonic acids, phosphoric acids or phosphorous acids and derivatives thereof, carboxylic acids with melting points above 60° C., quaternary ammonium carboxylates, or else combinations of the compounds stated.

The compositions comprising crosslinkers of the formula (I), a process for production and the use thereof are described by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited for the purposes of the present description, the entire content of these is intended to be part of the disclosure of the present invention.

Feedstocks:

Vestanat® EP-M95, isocyanatopropyltrimethoxysilane adduct with polyhydric alcohol, Evonik Resource Efficiency GmbH Setalux 1760 VB-64: polyacrylate polyol, Nuplex Resins B.V.

Tego Glide 410: slip and antiblocking additive, polyether siloxane copolymer (Evonik Resource Efficiency GmbH)

Vestanat® EP Cat 11 B: tetraethylammonium benzoate in butanol (Evonik Resource Efficiency GmbH)

Vestanat® HB 2640/100: polyisocyanate based on HDI biuret (Evonik Resource Efficiency GmbH)

Bona Traffic HD: binder component of the 2-component polyurethane dispersion in water (Bona Vertriebsgesellschaft mbH Deutschland, solids content about 32% by weight)

Bona Traffic hardener: hydrophilic, aliphatic polyisocyanate, as hardener component for Bona Traffic HD (Bona Vertriebsgesellschaft mbH Germany)

Polyglykol M500 PU: linear, monohydroxy-functional polyethylene glycol monomethyl ether (Clariant International Ltd.)

Vestanat® EP Cat 11 H: tetraethylammonium benzoate in butanol (Evonik Resource Efficiency GmbH)

Viscosity: DIN EN ISO 3219 (of 01.10.1994) at 23° C.+/−0.2° C., instrument: Anton Paar MCR 301 or Anton Paar MCR 302. It is possible to measure viscosities of 20-200 000 mPas.

EXAMPLES

1. Preparation of Crosslinkers

Example 1

Crosslinker V1

A three-neck flask with a reflux condenser was initially charged with 214.4 g of isocyanatopropyltrimethoxysilane (IPMS), 82.6 g of diethyl malonate and 3.0 g zinc ethylhexanoate and blanketed with nitrogen. The mixture was heated to 125° C. while stirring and then cooled down continuously to 70° C. within 7 h. The mixture was stirred at 70° C. for a further 17 h until an NCO content of 2.63% by weight had been attained. Then 14.7 g of butanol and 0.01% DBTL were added and the mixture was heated at 60° C. for 10 h until an NCO content of <0.1% by weight of NCO had been attained. After cooling to room temperature, the inventive hydrophilic crosslinker V1 was obtained as a clear yellow liquid with a viscosity of 53 mPas (at 23° C.).

Example 2

Crosslinker V2

A three-neck flask with a reflux condenser was initially charged with 450.5 g of isocyanatopropyltrimethoxysilane (IPMS), 345.5 g of diethyl malonate and 4.0 g zinc ethylhexanoate and blanketed with nitrogen. The mixture was heated to 60° C. while stirring and until, after 60 h, an NCO content of <0.1% by weight had been attained. After cooling to room temperature, the inventive crosslinker V2 was obtained as a clear yellow liquid with a viscosity of 62 mPas (at 23° C.).

Example 3

(Comparative) Crosslinker VG1

A three-neck flask with a reflux condenser was initially charged with 312.1 g of isocyanatopropyltrimethoxysilane (IPMS), 76.9 g of acetylacetone and 2.0 g zinc ethylhexanoate and blanketed with nitrogen. The mixture was heated to 80° C. while stirring and until, after 60 h, an NCO content of <0.1% by weight had been attained. After cooling to room temperature, the crosslinker VG1 was obtained as a clear brown liquid with a viscosity of 181 mPas (at 23° C.).

Example 4

Hydrophilic Crosslinker V4

Stage 1 (hydrophilic malonate): An apparatus with a distillation system and permanent nitrogen purging was initially charged with 59.9 g of diethyl malonate, 180.7 g of Polyglykol M500 and 0.048 g of octylglycol titanate (OGT). The mixture was heated to 100-120° C. while stirring until 17 g of ethanol had collected in the distillate receiver. The product that remained in the bottom was 223.4 g of the hydrophilic malonate, which was converted further in the subsequent stage.

Stage 2: A three-neck flask with a reflux condenser was initially charged with 155.4 g of isocyanatopropyltrimethoxysilane (IPMS), 223.4 g of hydrophilic malonate from Stage 1 and 4.0 g zinc ethylhexanoate and blanketed with nitrogen. The mixture was heated to 125° C. while stirring and then cooled down continuously to 70° C. within 7 h. The mixture was stirred at 70° C. for a further 17 h until an NCO content of 0.64% had been attained. Then 4.0 g of butanol and 0.36 g of DBTL were added and the mixture was heated at 60° C. for 10 h until an NCO content of <0.1% by weight of NCO had been attained. After cooling to room temperature, the inventive hydrophilic crosslinker V4 was obtained as a clear yellow liquid with a viscosity of 95 mPas (at 23° C.).

Example 5

Hydrophilic Crosslinker V5

A three-neck flask with a reflux condenser was initially charged with 76.0 g of isocyanatopropyltriethoxysilane (IPES), 23.5 g of diethyl malonate and 0.5 g zinc ethylhexanoate and blanketed with nitrogen. The mixture was heated to 80° C. while stirring for 5 h and then cooled down to room temperature. The mixture was left to stand at room temperature for 4 days until an NCO content of <0.4% by weight of NCO had been attained. The inventive hydrophilic crosslinker V5 thus obtained was a clear yellow liquid with a viscosity of 67 mPas (at 23° C.).

Example 6

Hydrophilic Crosslinker V6

A three-neck flask with a reflux condenser was initially charged with 303.5 g of isocyanatopropyltrimethoxysilane (IPMS), 95.5 g of ethyl acetoacetate and 2.0 g zinc ethylhexanoate and blanketed with nitrogen. The mixture was heated to 60° C. while stirring for 20 days until an NCO content of <0.4% by weight of NCO had been attained. After cooling to room temperature, the inventive hydrophilic crosslinker V4 was obtained as a clear brown liquid with a viscosity of 64 mPas (at 23° C.).

2. Viscosity Compared to the Related Art

Table 1 compares the viscosities of the inventive crosslinkers V1 and V2 with crosslinker VG1 and Vestanat HB 2640/100, which is a polyisocyanate based on HDI biuret.

TABLE 1

| Viscosity (at 23° C.) | |
|---|---|
| | Viscosity (23° C.) |
| Inventive crosslinker V1 | 53 mPas |
| Inventive crosslinker V2 | 62 mPas |
| Comparative example crosslinker VG1 | 181 mPas |
| Vestanat HB 2640/100 | 10000 mPas |

The noninventive crosslinker VG1 has a viscosity higher by fac or of 3 a d the oninventive Vestanat HB 2640/100 a viscosity higher by a factor of 200 than the inventive low-viscosity crosslinkers V1 and V2.

3. Production of Coating Materials, Clearcoat Here

For the production of the coating materials I-IV, the products listed in Table 2 were homogenized at room temperature. The viscosity of the formulations, determined as the flow time in the DIN 4 cup at 23° C., was approximately 20 seconds.

To determine the paint properties, the coating materials I-IV were each applied with a 100 μm coating bar to sheets of the Gardobond OC26 type and dried at 140° C. for 22 min.

With the inventive coating materials I-II, it was possible to obtain nonstock, shiny coatings with good mechanical and chemical stability (Table 3). Moreover, the inventive formulations I-II contained less solvent than comparative examples III and IV.

4. Production of an RT-Curing Clearcoat Using Hydrophilic Crosslinker

For the formulation of the inventive RT-curing clearcoats and of the comparative examples, the components of the compositions shown in Table 4 were used. The binder component (here: Bona Traffic HD, contains water and polyurethane, solids content about 32% by weight) was initially charged here in a bottle, the hydrophilic crosslinker was added and the mixture was stirred vigorously with a wooden spatula for about 30 seconds. A homogeneous dispersion was formed. This dispersion was filtered through an 80 μm filter and then knife-coated with a film thickness of 15-35 μm onto steel panels (Gardobond GB26S 60 OC) using a 120 μm spiral coating bar. This coated panel was then left to stand and then subjected to analytical testing at room temperature.

The viscosity of the formulations, determined as the flow time in the DIN 4 cup at 23° C., was approximately 20 seconds.

For the determination of the pot life listed in Table 5, the respective paint batch from Table 4 was applied in a time-dependent manner by means of a 120 μm spiral coating bar to a black/white chart and the resulting coating was assessed. The end of the pot life was defined by the occurrence of coating bar streaks.

It is apparent from Table 5 that the coatings composed of compositions III, IV, VI and VII containing the inventive hydrophilic crosslinkers V1, V4, V6 and V2 have good coating properties. More particularly, coatings III, VI and VII actually show better chemical resistances (MEK test) than the related art, coating II with the Bona Traffic hardener, a hydrophilic polyisocyanate, as hardener. Additionally remarkable is the pot life of one day exhibited by composition IV with hydrophilic crosslinker V4.

The composition with the hydrophilic crosslinker V5 based on IPES unexpectedly does not show properties as excellent as the other compositions based on IPMS.

TABLE 2

Composition of the inventive clearcoats and comparative example, figures in % by weight

| Item | | I (V1) | II (V2) | III (comparative) | IV (VG1) |
|---|---|---|---|---|---|
| 1 | Inventive crosslinker V1 | 30.6 | | | |
| 2 | Inventive crosslinker V2 | | 30.6 | | |
| 3 | Crosslinker VG1 (comparative) | | | | 28.9 |
| 4 | Vestanat HB 2640/100 | | | 16.3[1)] | |
| 5 | Setalux 1760 | 47.7 | 49.7 | 40.8 | 45.1 |
| 6 | Tego Glide 410 (10% in BA) | 0.4 | 0.4 | 0.5 | 0.4 |
| 7 | Vestanat EP Cat 11B | 1.3 | 1.3 | | 1.5 |
| 8 | Butyl acetate/xylene mixture (1:1) | 20.0 | 16.7 | 42.4 | 24.1 |

[1)]Vestanat HB2640/100 was used together with Setalux 1760 in an NCO/OH ratio of 1.1:1.0.

TABLE 3

Coating properties of the compositions I-IV after curing at 140° C. for 22 min

| Composition | I (inventive) | II (inventive) | III (comparative) | IV (comparative) |
|---|---|---|---|---|
| Pendulum hardness (König) [s] n 7 d | 164 | 146 | 189 | 176 |
| MEK test [ASTM D 4752] (twin strokes, 1 kg weight applied) | >150 | >150 | >150 | >150 |

TABLE 4

Composition of the inventive RT-curing clearcoats and comparative example, FIGURES in parts by weight

| Item | | I | II | III (V1) | IV (V4) | V (V5) | VI (V6) | VI (V2) |
|---|---|---|---|---|---|---|---|---|
| 1 | Bona Traffic HD (binder component) | 100 | 90 | 90.0 | 90.0 | 89.6 | 89.6 | 89.6 |
| 2 | Bona Traffic hardener | | 10 | | | | | |
| 3 | Example V4 | | | | 10.0 | | | |
| 4 | Example V5 | | | | | 10.0 | | |
| 5 | Example VG1 | | | 9.95 | | | | |
| 6 | Example V6 | | | | | | 9.95 | |
| 7 | Example V2 | | | | | | | 9.95 |
| 8 | Vestanat EP Cat 11 H | | | | 0.45 | 0.45 | 0.45 | |

TABLE 5

Coating properties of the compositions I-IV after curing at 23° C. (7 days)

| Composition | I | II | III (V1) | IV (V4) | V (V5) | VI (V6) | VII (V2) |
|---|---|---|---|---|---|---|---|
| Erichsen cupping [mm] (EN ISO 1520) | 8.0 | 8.0 | 7.5 | 7.5 | 8.0 | 7.5 | 10 |
| Ball impact [inch lbs] (DIN-EN-ISO 6272-1) | 80 | 80 | >160 | 80 | 80 | 80 | 80 |
| MEK test [ASTM D 4752] (twin strokes, 1 kg weight applied) | 10 | 80 | 150 | 65 | 10 | 150 | 150 |
| Pot life of the two-component system | — | 4 h | 1 d | >1 d | — | 3 h | 4 h |

The invention claimed is:

1. A crosslinker of formula (I) or a mixture of at least two crosslinkers of formula (I)

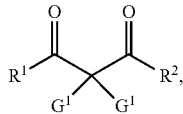
(I)

wherein $R^1$ and $R^2$ are each independently selected from the group consisting of H, —$(CH_2)_rR^4$, with r=0 to 12, —$OR^5$, and —$NHR^5$, wherein $R^4$ and $R^5$ are each independently selected from the group consisting of H, an alkyl group optionally containing a heteroatom, and having 1 to 18 carbon atoms, a cycloalkyl group optionally containing a heteroatom, and having 3 to 18 carbon atoms, an alkylaryl group optionally containing a heteroatom, and having 6 to 18 carbon atoms, a bivalent alkylene group having 1 to 10 carbon atoms, an alkylene oxide group having at least 4 carbon atoms, a polyether group, a polyhydroxy-functional group having 1 to 18 carbon atoms, a heteroaromatic group containing —O— and/or N- and having 5 to 18 carbon atoms and an —O— or NH-polyether group containing one or more different polyglycol units $(CH_2CH_2O)_pR''$, wherein p is 4 to 20 and R'' is an alkyl radical having 1 to 18 carbon atoms or H, and wherein each $G^1$ is a group of formula (IIa)

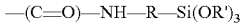
(IIa), wherein R in formula (IIa) is independently an aliphatic (cyclo)alkylene radical having 1 to 10 carbon atoms, and R' in formula (IIa) in each case independently represents a linear, branched or cyclic alkyl radical having 1 to 10 carbon atoms, wherein a) in the crosslinker of formula (I) at least one of $R^1$ and $R^2$ is selected from —$OR^5$, wherein $R^5$ is as defined above, or b) in the crosslinker of formula (I) $R^1$ and $R^2$ are selected from —$OR^5$, wherein $R^5$ is as defined above.

2. A composition, comprising:
at least one crosslinker of formula (I) according to claim 1 or a mixture comprising at least two of the crosslinkers of formula (I) according to claim 1

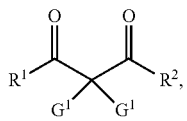
(I)

wherein $R^1$ and $R^2$ are each independently selected from the group consisting of H, —$(CH_2)_rR^4$, with r=0 to 12, —$OR^5$, and —$NHR^5$, wherein $R^4$ is selected from H, $CH_3$, an alkyl group optionally containing a heteroatom, and having 2 to 18 carbon atoms, a cycloalkyl group optionally containing a heteroatom, and having 3 to 18 carbon atoms, an alkylaryl group optionally containing a heteroatom, and having 6 to 18 carbon atoms, a bivalent alkylene group having 1 to 10 carbon atoms, an alkylene oxide group having at least 4 carbon atoms, a polyether group, a polyhydroxy-functional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, wherein p is 4 to 20 and R'' is an alkyl radical having 1 to 18 carbon atoms or H, $R^5$ is selected from the group consisting of H, an alkyl group optionally containing a heteroatom, and having 1 to 18 carbon atoms, a cycloalkyl group optionally containing a heteroatom, and having 3 to 18 carbon atoms, an alkylaryl group optionally containing a heteroatom, and having 6 to 18 carbon atoms, a bivalent alkylene group having 1 to 10 carbon atoms, an alkylene oxide group having at least 4 carbon atoms, a polyether group, a polyhydroxy-functional group having 1 to 18 carbon atoms, a heteroaromatic group containing —O— and/or —N— and having 5 to 18 carbon atoms and an —O— or —NH-polyether group containing one or more different polyglycol units $(CH_2CH_2O)_pR''$, wherein p is 4 to 20 and R'' is an alkyl radical having 1 to 18 carbon atoms or H, and wherein each $G^1$ is a group of formula (IIa)

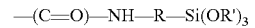
(IIa), wherein R in formula (IIa) is independently an aliphatic (cyclo)alkylene radical having 1 to 10 carbon atoms, and R' in formula (IIa) in each case independently represents a linear, branched or cyclic alkyl radical having 1 to 10 carbon atoms.

3. The composition according to claim 2, wherein
a) $R^1$ and $R^2$ in formula (I) are selected from —$OR^5$, wherein $R^5$ is as defined above, or
b) $R^1$ in formula (I) is selected from —$(CH_2)_rR^4$, with (i) r=0 or (ii) r=1 to 12, wherein $R^4$ is in each case independently selected from the group consisting of $CH_3$, an alkyl group optionally containing a heteroatom, and having 2 to 18 carbon atoms, a cycloalkyl group optionally containing a heteroatom, and having 3 to 18 carbon atoms, an alkylaryl group containing a heteroatom, and having 6 to 18 carbon atoms, an alkylene oxide group having at least 4 carbon atoms, and a heteroaromatic group containing an —O— and/or —N— and having 5 to 18 carbon atoms, and $R^2$ is selected from —$OR^5$ wherein $R^5$ is as defined above.

4. The composition according to claim 2, wherein the crosslinker of formula (I) is a β-diester, a β-keto ester and/or a β-amide ester.

5. The composition according to claim 2, wherein R in formula (IIa) is in each case independently an aliphatic alkylene radical having 1 to 10 carbon atoms, and R' in each case independently represents a linear, branched or cyclic alkyl radical having 1 to 4 carbon atoms or H.

6. The composition according to claim 2, wherein R in formula (IIa) is in each case independently an aliphatic alkylene radical having 1 to 10 carbon atoms, R' in formula (IIa) in each case independently represents a linear, branched or cyclic alkyl radical having 1 to 4 carbon atoms or H, and $R^1$ and $R^2$ in formula (I) are each independently selected from —$OR^5$ wherein $R^5$ is selected from the group consisting of an alkyl group having 1 to 18 carbon atoms, a cycloalkyl group having 3 to 18 carbon atoms, an alkylaryl group having 6 to 18 carbon atoms and an alkylene oxide group having at least 4 carbon atoms.

7. A process for preparing a composition comprising the crosslinker of formula (I) or mixture of at least two crosslinkers of formula (I) as claimed in claim 1, said process comprising:

(i) reacting
at least one isocyanatoalkylalkoxysilane of formula (II) or a mixture of at least two of the isocyanatoalkylalkoxysilanes of formula (II), (R'O)$_3$Si—R—N=C=O       (II)

wherein R is in each case independently an aliphatic (cyclo)alkylene radical having 1 to 10 carbon atoms, and R' in each case independently represents a linear, branched or cyclic alkyl radical having 1 to 10 carbon atoms,
with an organofunctional C—H-acidic compound of formula (III) having at least two acidic hydrogen atoms,

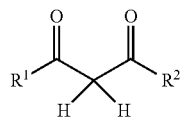       (III)

wherein R$^1$ and R$^2$ are each independently selected from the group consisting of H, —(CH$_2$)$_r$R$^4$, with r=0 to 12, —OR$^5$ and —NHR$^5$, wherein R$^4$ is selected from the group consisting of H, CH$_3$, an alkyl group optionally containing a heteroatom, and having 2 to 18 carbon atoms, a cycloalkyl group optionally containing a heteroatom, and having 3 to 18 carbon atoms, an alkylaryl group optionally containing a heteroatom, and having 6 to 18 carbon atoms, a bivalent alkylene group having 1 to 10 carbon atoms, an alkylene oxide group having at least 4 carbon atoms, a polyether group, a polyhydroxy-functional group having 1 to 18 carbon atoms, a heteroaromatic group containing —O— and/or —N— and having 5 to 18 carbon atoms and an —O— or —NH-polyether group containing one or more different polyglycol units (CH$_2$CH$_2$O)$_p$R", wherein p is 4 to 20 and R" is an alkyl radical having 1 to 18 carbon atoms or H,
R$^5$ is selected from the group consisting of H, an alkyl group optionally containing a heteroatom, and having 1 to 18 carbon atoms, a cycloalkyl group optionally containing a heteroatom, and having 3 to 18 carbon atoms, an alkylaryl group optionally containing a heteroatom, and having 6 to 18 carbon atoms, a bivalent alkylene group having 1 to 10 carbon atoms, an alkylene oxide group having at least 4 carbon atoms, a polyether group, a polyhydroxy-functional group having 1 to 18 carbon atoms, a heteroaromatic group containing —O— and/or —N— and having 5 to 18 carbon atoms and an —O— or —NH-polyether group containing one or more different polyglycol units (CH$_2$CH$_2$O)$_p$R", wherein p is 4 to 20 and R" is an alkyl radical having 1 to 18 carbon atoms or H.

8. The process according to claim 7, wherein the reaction is effected in the presence of a catalyst.

9. The process according to claim 7, wherein the process further comprises:
(ii) removing excess isocyanatoalkylalkoxysilane of formula (II), or reacting excess isocyanatoalkylalkoxysilane of formula (II) with a hydroxy-functional hydrocarbon compound, and
(iii) obtaining a composition comprising at least one crosslinker of formula (I) or a mixture of at least two of the crosslinkers of formula (I).

10. The process according to claim 7, wherein the isocyanatoalkylalkoxysilane of formula (II) is selected from the group consisting of isocyanatopropyltriethoxysilane and isocyanatopropyltrimethoxysilane.

11. The process according to claim 7, wherein the reaction of isocyanatoalkylalkoxysilane of formula (II) with the organofunctional C—H-acidic compound of formula (III) is effected in a molar ratio of 1.1:1 to 100:1.

12. A composition, comprising:
(i) at least one crosslinker or a mixture of crosslinkers according to claim 1,
(ii) optionally, an organic solvent,
(iii) one or more binders,
(iv) optionally, up to 4% by weight of at least one catalyst,
(v) optionally, an auxiliary and/or additive,
(vi) optionally, water.

13. A method of treating a substrate, comprising:
a composition according to claim 1,
wherein said substrate is based on at least one material selected from the group consisting of metals, alloys, wood, glass, stone, ceramic materials, hybrid materials, concrete, rigid plastics, flexible plastics, textiles, leather and paper.

* * * * *